(12) United States Patent
Gruetzmacher, Jr. et al.

(10) Patent No.: US 6,243,957 B1
(45) Date of Patent: Jun. 12, 2001

(54) INSERT MOLDING OF A LIQUID-CONTAINING MEMBER, SUCH AS A LEVEL VIAL, AND AN ARTICLE OF MANUFACTURE FORMED THEREBY

(75) Inventors: Richard J. Gruetzmacher, Jr., Colgage; Wayne R. Kinnally, Tomahawk; James C. Koehler, Belgium, all of WI (US)

(73) Assignee: Johnson Level & Tool Mfg. Co., Inc., Mequon, WI (US)

( * ) Notice: Subject to any disclaimer, the term of this patent is extended or adjusted under 35 U.S.C. 154(b) by 0 days.

(21) Appl. No.: 09/281,583

(22) Filed: Mar. 30, 1999

Related U.S. Application Data (60) Provisional application No. 60/080,215, filed on Mar. 31, 1998.

(51) Int. Cl.[7] .................................................. G01C 9/28
(52) U.S. Cl. .............................................. 33/382; 33/379
(58) Field of Search ............................. 33/379, 381, 382, 33/383, 384, 389, 377

(56) References Cited

U.S. PATENT DOCUMENTS

| | | |
|---|---|---|
| 2,813,349 | 11/1957 | Harris . |
| 3,016,669 | 1/1962 | Grosclaude . |
| 3,442,024 | 5/1969 | Don . |
| 3,989,787 | 11/1976 | Scott, Jr. et al. . |
| 4,141,951 | 2/1979 | Beckman . |
| 4,332,046 | 6/1982 | Foley et al. . |
| 4,419,833 * | 12/1983 | Wright ................................. 33/379 |
| 4,571,845 | 2/1986 | Wright et al. . |
| 4,653,193 * | 3/1987 | Kennedy et al. ..................... 33/379 |
| 4,860,459 * | 8/1989 | Dengler ................................ 33/381 |
| 5,020,232 * | 6/1991 | Whiteford ............................ 33/379 |
| 5,091,131 | 2/1992 | Schmacher et al. . |
| 5,105,549 * | 4/1992 | Johnson .............................. 33/379 |
| 5,279,041 * | 1/1994 | Wright ................................. 33/382 |
| 5,412,876 * | 5/1995 | Scheyer ............................... 33/379 |
| 5,430,266 | 7/1995 | Austin, Jr. et al. . |
| 5,453,230 | 9/1995 | McClelland et al. . |
| 5,547,620 | 8/1996 | Guiotto . |
| 5,651,186 * | 7/1997 | Lindner et al. ...................... 33/377 |
| 5,749,152 * | 5/1998 | Goss et al. .......................... 33/377 |
| 5,755,623 * | 5/1998 | Mizenko ............................. 33/384 |
| 6,026,581 * | 2/2000 | Gruetzmacher ..................... 33/377 |

FOREIGN PATENT DOCUMENTS

| | | |
|---|---|---|
| 0489955 | 6/1992 | (EP) . |
| 2057365 | 6/1992 | (CA) . |

* cited by examiner

Primary Examiner—G. Bradley Bennett
(74) Attorney, Agent, or Firm—Andrus, Sceales, Starke & Sawall, LLP

(57) ABSTRACT

A liquid-containing member is insert molded into a body. The liquid-containing member may be in the form of a level vial, which can be insert molded in a mold cavity having a shape corresponding to a vial retainer or corresponding to a level. The mold cavity is defined by a pair of mold sections which are configured to form an opening in the body, and the level vial is positioned to extend across the areas of the mold sections defining the opening. The ends of the level vial extend into an area of the mold cavity adapted to receive moldable material, such that injection of moldable material into the mold cavity surrounds and encapsulates the ends of the level vial. The vial is thus mounted to the body by means of the moldable material surrounding and encapsulating the ends of the vial, to securely engage the vial with the body and to eliminate a previously-required assembly step of mounting a vial to a body such as a vial retainer or a level.

31 Claims, 7 Drawing Sheets

INSERT MOLDING OF A LIQUID-CONTAINING MEMBER, SUCH AS A LEVEL VIAL, AND AN ARTICLE OF MANUFACTURE FORMED THEREBY

This application claims benefit of Provisional Application No. 60/080,215 filed Mar. 31, 1998.

BACKGROUND AND SUMMARY OF THE INVENTION

This invention relates to injection molding, and more particularly to injection molding of plastic material around a level vial or other member containing an encapsulated volume of fluid.

A level vial consists of a tubular member formed of a translucent material having a volume of fluid in its interior. Typically, a vial is constructed by filling a cylindrical member with fluid and then securing a cap to the open end of the cylindrical member to seal the interior of the cylindrical member and retain the fluid therein. The fluid occupies less than the entire volume of the closed interior of the cylindrical member, to form a bubble. The cylindrical member is formed of a translucent plastic material, to enable the bubble to be viewed from the exterior of the vial after it has been constructed as described.

Level vials are mounted to the frame of a level in a variety of ways. In one arrangement, a metal frame includes a web located between a pair of spaced flanges. The web is provided with a series of openings and each opening includes a pair of notches for receiving the ends of the vial, such that the vial extends across the opening. A pair of plastic covers are located one on each side of the frame. The covers are connected together, such as by a snap fit arrangement, and the frame web and the vials are disposed between the covers to form a composite level construction in which the covers function to retain the vials in position within the web openings. Alternatively, a pair of separate covers can be provided for each vial. Each pair of covers are engaged together with the frame web and the vial therebetween, such that each pair of covers functions to retain one of the vials in position. In another arrangement, a level body is provided with a series of openings, and vial-retaining structure is associated with each opening so as to enable the ends of the vial to be snap-fit into the opening. In a wood level construction, openings are formed in the wood frame for receiving one or more vials. The vials are placed within the openings, and plastic retainers are received within the openings and engaged with the vials for maintaining the vials in position. Transparent covers are mounted on either side of the frame over the opening for protecting the vials and enabling the vials to be viewed from the exterior of the frame.

It is an object of the present invention to provide an arrangement for mounting a level vial to a level, which eliminates the need for separate covers to maintain a level vial in position relative to the frame. It is another object of the invention to provide a level vial mounting system which eliminates the need for engaging a level vial with a level body in a snap-fit manner. It is a further object of the invention to provide a simplified system for engaging a level vial with a vial mounting component which is adapted for engagement with a level frame. A still further object of the invention is to provide a simple and efficient arrangement for engaging any liquid-containing member with a body or other structure formed of a moldable material. Yet another object of the invention is to provide an arrangement for insert molding a liquid-containing member along with a body.

In accordance with the invention, moldable material is molded about a liquid-containing member to form a body, such that the body is integrally formed about the liquid containing member. The liquid-containing member may be molded into the body in an insert molding process, in which the liquid-containing member is engaged between a pair of mold sections which cooperate to define a mold cavity having a shape corresponding to the desired final shape of the body. In one form, the mold sections include structure adapted to form an opening in the molded member, and the liquid-containing member is positioned relative to the mold sections so as to extend across the structure which forms an opening in the molded member. The liquid-containing member defines a pair of end portions, each of which is located within a portion of the mold cavity located adjacent the structure in the mold sections which forms an opening in the molded member, such that the moldable material surrounds and encapsulates the end portions of the liquid-containing member when injected into the mold cavity.

The invention can be used to construct a level or a vial mounting component for use in combination with a level frame. In one embodiment, the mold cavity is configured to form a level having at least one gauging surface and a web. The mold sections are configured to form one or more openings in the web, and a level vial is engaged with the mold sections so as to extend across each opening formed in the molded member. When moldable material is injected into the mold cavity, the moldable material surrounds and encapsulates the ends of the vial on either side of each opening, to form an integral, molded level with insert molded level vials. The insert molding of the level vials provides accurate placement of the vials relative to the gauging surface of the level, and also securely mounts the vials to the level so as to prevent the vials from being disengaged from the level.

In another embodiment, the mold sections are configured to receive a level frame which has one or more openings, with each opening having a pair of notches for receiving the ends of a level vial. The frame and the vials are loaded into the mold sections, and the mold cavity is formed so as to provide moldable material about the ends of each vial and at least a portion of the frame, so as to securely retain the level vials in position on the frame. The cavity may be formed so as to extend beyond the ends of the frame, to form molded end caps which are integrally molded along with the moldable material which overlies the ends of the level vials.

In another embodiment, a level vial is insert molded in a vial mounting component for use in mounting a vial to the frame of a level, such as within an opening formed in a wood level frame. The vial mounting component includes a pair of spaced walls, and the level vial extends between the walls. Each wall is formed of moldable material which forms a protrusion surrounding and encapsulating an end portion of the vial. The vial mounting component may be adapted for use in combination with another similarly constructed vial mounting component, to mount a pair of vials within the frame opening.

The present invention simplifies assembly of a level by insert molding the level vials along with the plastic material of a level body or a cover member, or along with a retainer member engageable within an opening formed in a level frame.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
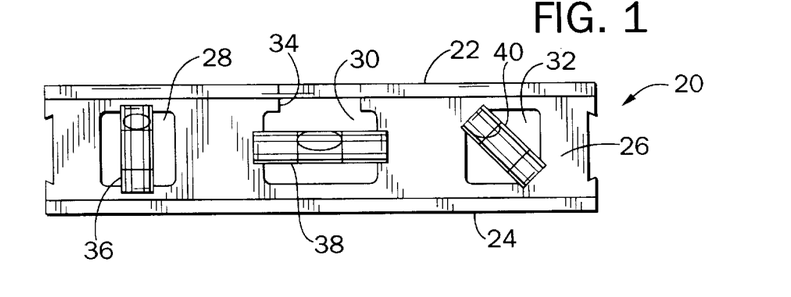
FIG. 1 is an isometric view of a level frame and a series of level vials which are adapted for use in the insert molding process of the invention, to form an insert molded composite level.

FIG. 1 shows a level frame 20 having a top flange 22, a bottom flange 24 and a web 26 extending between top and bottom flanges 22, 24. The outer surfaces of top and bottom flanges 22, 24, respectively, define parallel gauging surfaces extending parallel to the longitudinal axis of frame 20. Web 26 is preferably an extruded member formed of a metallic material such as aluminum, and openings 28, 30 and 32 are formed in web 26. A passage 34 is formed in flange 22 to provide visual access to opening 32 through flange 22 and the portion of web 26 lying between opening 30 and flange 22.

Opening 28 includes notches in its upper and lower edges for receiving the top and bottom ends of a level vial, shown at 36. Level vial 36 is constructed in a conventional manner of a liquid-filled cylinder closed with an end cap to retain the liquid within an internal cavity defined by vial 36. The notches, within which the ends of vial 36 are received, are oriented relative to top and bottom flanges 22, 24, respectively, such that the longitudinal axis of level vial 36 is substantially perpendicular to the gauging surfaces defined by flanges 22, 24. Similarly, notches are formed in the facing side edges of opening 30 for receiving the ends of a vial 38, which is slightly longer than vial 36. The notches of opening 30 are formed such that the longitudinal axis of vial 38 is substantially parallel to the gauging surfaces defined by flanges 22,24 and thereby substantially perpendicular to the longitudinal axis of vial 36. Notches are formed at opposite corners of opening 32 for receiving the ends of a vial 40 which is of the same construction as vial 36, and are oriented such that the longitudinal axis of vial 40 in opening 32 is at an angle of 45° relative to the gauging surfaces defined by flanges 22, 24 and to the longitudinal axes of vial 38 and vial 36.

With vials 36, 38 and 40 loaded into frame 20 as shown and described, frame 20 is placed in a cavity defined by a forming tool, such as an injection molding die. Alternatively, frame 20 and vials 36, 38 and 40 may be separately loaded into the injection molding die. Plastic material is then molded around frame 20 and vials 36, 38 and 40 to form a composite level construction, shown generally at 42 in FIGS. 2 and 3. Composite level 42 includes frame 20 with flanges 22 and 24 exposed, and plastic material is formed about web 26 and the ends of vials 36, 38 and 40.

Figure 2:
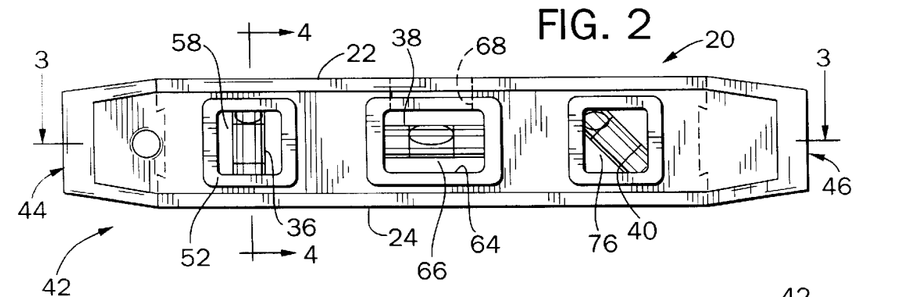
FIG. 2 is a front elevation view of a composite insert molded level produced utilizing the frame and level vials of FIG. 1.
Figure 3:
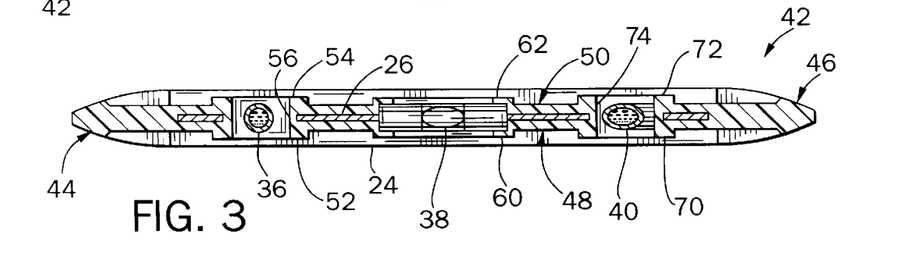
FIG. 3 is a section view taken along line 3—3 of FIG. 2.

The plastic material of composite level 42 includes a pair of end members 44, 46 and a pair of side plate members 48, 50. End members 44 and 46 are formed integrally with side plate members 48 and 50, such that a one-piece unitary plastic member is formed about web 26. Side plate members 48 and 50 include matching raised rectangular sections 52, 54, respectively, located over opening 28 in web 26. Rectangular sections 52, 54 include a common inner wall 56 which is located inwardly of the edges of opening 28, and which forms the boundary of an opening 58 across which vial 36 extends. The upper and lower portions of raised rectangular sections 52, 54 encapsulate and surround the upper and lower ends, respectively, of vial 36, so as to retain vial 36 within the notches formed in frame opening 28 and to thereby maintain vial 36 in its predetermined orientation in composite level 42. In a similar manner, side plate members 48, 50 define matching raised rectangular sections 60, 62, respectively, over frame opening 30, which include a common inner wall 64 which is located inwardly of the edges of opening 30, and which define an opening 66 across which vial 38 extends. The opposite side portions of raised rectangular sections 60, 62 encapsulate and surround the ends of vial 38 to maintain the ends of vial 38 in position within the notches formed in frame opening 30, to thereby maintain vial 38 in its predetermined orientation in composite level 42. A passage 68 is formed in the upper extent of raised rectangular sections 60, 62 in alignment with passage 34 in frame 20, to allow vial 38 to be viewed through flange 22. Side plate members 48, 50 further include matching raised rectangular sections 70, 72, respectively, over frame opening 32, which include a common inner wall 74 which is located inwardly of the edges of opening 32, and which define an opening 76 across which vial 40 extends. The corners of raised rectangular sections 70, 72 encapsulate and surround the ends of vial 40 to maintain the ends of vial 40 in position within the notches formed in frame opening 32, to thereby maintain vial 40 in its predetermined orientation in composite level 42.

Figure 4:
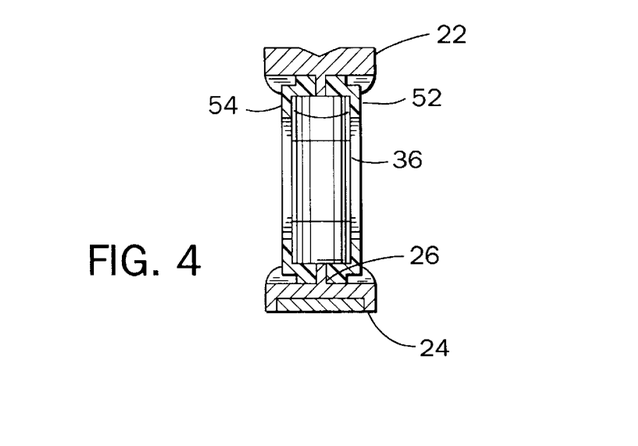
FIG. 4 is a section view taken along line 4—4 of FIG. 2.
Figure 5:
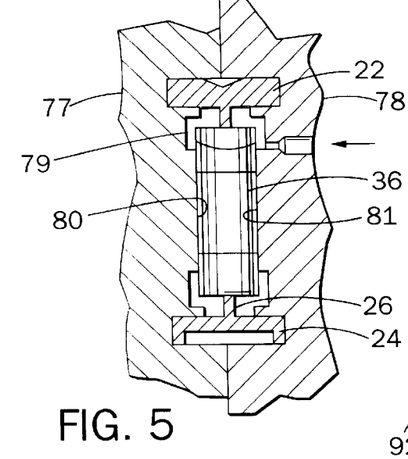
FIG. 5 is a view illustrating portions of a pair of mold sections used to form the composite level construction of FIGS. 2–4.

As shown in FIG. 5, the tooling within which composite level 42 is formed includes a pair of mold halves 77, 78 which define an internal cavity 79 which conforms precisely to the desired end configuration of composite level 42. To produce composite level 42, frame 20 is loaded into mold cavity 79 and vials 36, 38 and 40 are then loaded into recessed areas in the mold cavities which accept vials 36, 38 and 40. Mold halves 77, 78 include vial engagement surfaces 80, 81, respectively, for each of vials 36, 38 and 40 which ensure that vials 36, 38 and 40 are properly positioned relative to the plane of web 26 when the tooling is closed, to ensure that vials 36, 38 and 40 are filly inserted into the mold recesses and thereby into the notches in web 26 which receive the ends of vials 36, 38 and 40. Plastic material is then injected into mold cavity 79 so as to surround frame 20 as shown in FIGS. 2–4 and to form side plate members 48, 50 and end members 44 and 46 integrally about the sides and ends, respectively, of frame 20. The tooling is then opened and the sprues through which the plastic material is injected into the mold cavity are removed.

Alternatively, a metal frame level can be formed in a similar manner without end members 44, 46 and without the portions of side plate members 48, 50 between the matching raised rectangular sections defining openings 58, 66 and 76. In this arrangement, matching raised rectangular sections 52 and 54 are formed so as to surround the portions of web 26 adjacent frame opening 28 to encapsulate and surround the ends of vial 36. Similarly, matching rectangular sections 60 and 62 are formed about the portions of web 26 adjacent frame opening 30, and matching raised rectangular sections 70, 72 are formed about the portions of web 26 adjacent frame opening 32. The portions of web 26 between each set of matching raised rectangular sections is left exposed, as are the ends of the frame.

Figure 6:
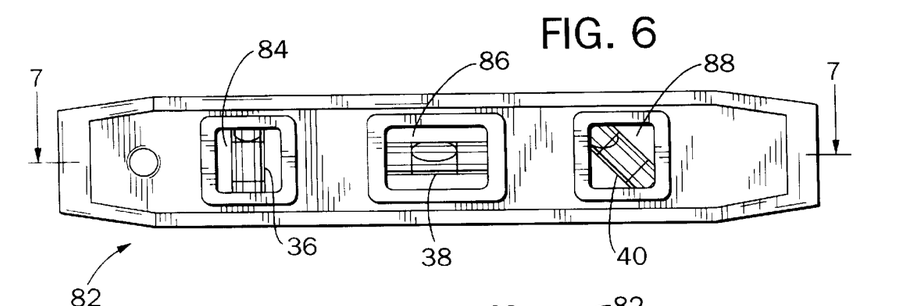
FIG. 6 is a view similar to FIG. 2, showing an embodiment in which the level frame of FIG. 1 is omitted and the level is formed of a one-piece molded construction.
Figure 7:
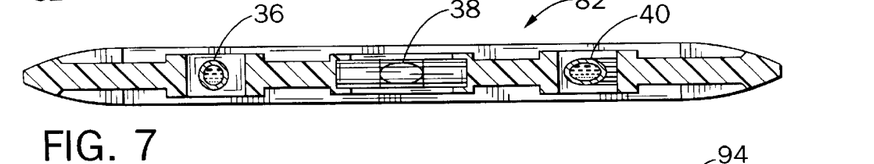
FIG. 7 is a section view taken along line 7—7 of FIG. 6.

FIGS. 6 and 7 illustrate a one-piece plastic level 82. In this embodiment, frame 20 is not used and instead plastic material is injected fully around vials 36, 38 and 40 after vials 36, 38 and 40 have been loaded into a mold cavity having the shape of level 82 as shown. Vials 36, 38 and 40 are loaded into vial-receiving recesses in the forming tooling, and the tooling is then closed. Plastic material is injected into the mold cavity and surrounds the ends of vials 36, 38 and 40 to maintain vials 36, 38 and 40 in their desired positions and to form the plastic material into the final desired shape of level 82. Level 82 is formed so as to define openings 84, 86 and 88, and vials 36, 38 and 40, extend across openings 84, 86 and 88, respectively. The general construction of the plastic material of level 82 is as set forth with respect to FIGS. 1–4, with the exception that frame 20 is eliminated and plastic material is in its place. The plastic material of level 82 defines the gauging surfaces of level 80, and surrounds and encapsulates the ends of vials 36, 38 and 40, to maintain vials 36, 38 and 40 in position. This construction thus provides a one-piece level with level vials 36, 38 and 40 insert molded into the body of the level.

Figure 8:
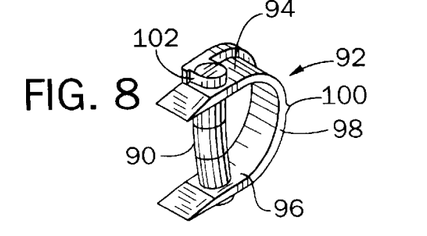
FIG. 8 is an isometric view of a vial mounting component with an insert molded level vial, in accordance with the invention.
Figure 10:
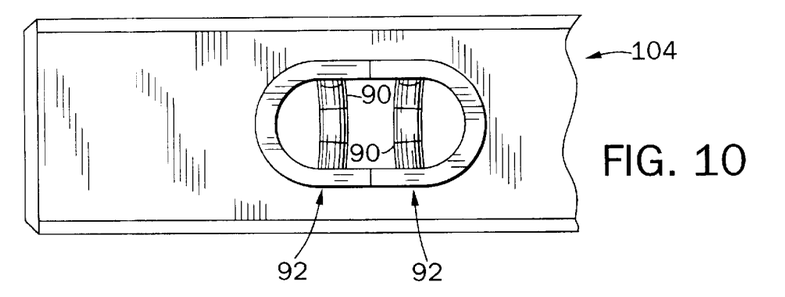
FIG. 10 is a partial elevation view showing a pair of vial mounting components as in FIG. 8 mounted to the frame of a level.

FIG. 8 illustrates a curved vial 90 having a vial retainer 92 molded around its ends. Vial retainer 92 defines spaced walls 94 and 96, with a curved wall 98 extending between and interconnecting spaced walls 94, 96. Curved wall 98 includes a locating tab 100. Curved vial 90 is insert molded with vial retainer 92 by placing vial 90 into a mold cavity having a configuration which accepts vial 90 and which defines the final shape of vial retainer 92 as shown. Plastic material is then injected into the mold cavity to form a protrusion 102 on each of walls 94, 96 which surrounds and encapsulates an end of vial 90. When vial retainer 92 is removed from the mold, vial 90 is molded into vial retainer 92 such that vial 90 is in a predetermined position and orientation relative to the remainder of vial retainer 92. A pair of vial retainers 92 are then positioned within an opening formed in the frame of a level, such as a wood level 104 as shown in FIG. 10 and are secured in position in a manner as is known. Typically, a window or cover is also secured to the level frame for enclosing and protecting the vials. With this arrangement, a vial is insert molded along with a retainer component for use in mounting to a frame to secure the vial in position relative to the frame.

Figure 9:
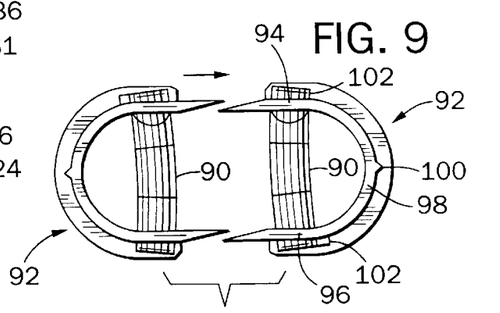
FIG. 9 is an elevation view of a pair of vial mounting components as illustrated in FIG. 8.

In all of the embodiments as shown and described, the vials are insert molded along with another component so as to ease assembly and reduce the number of parts or steps involved in assembly. In the embodiment of FIGS. 1–5, it is possible to provide a single tool which has the desired final shape of level 42 in combination with recesses for receiving frame 20 and vials 36, 38 and 40. It is thus unnecessary to have a set of tools which form separate side plates which are snapped together about the frame and vial. In addition, the step of assembling the side plates to the frame and vials is eliminated. In the embodiment of FIGS. 6 and 7, the vials are formed integrally with the material of the level, thus eliminating the step of snapping vials into openings formed in a plastic level. In addition, the vial ends are fully surrounded and encapsulated by plastic material, which eliminates the possibility that the vial can accidentally fall or be pushed out of the opening. In the embodiment of FIGS. 8–10, the vial is molded to another component which is used to mount the vial to a level frame, thus ensuring that the vial is always in a desired position relative to the mounting component and eliminating the number of steps required to assemble the vial to the frame.

The invention has been shown and described in connection with a hand tool in the form of a level. It should be understood that the invention can be utilized to insert mold a vial into any tool and is not limited for use in a level. For example, the invention can be used to insert mold a level vial into any other type of hand tool such as in the handle of a square, in a combination square, in a bubble stick or any other tool having a plastic injection molded member. The invention can also be used to insert mold a level vial into the handle of a power tool, or in any other application, assembly or subassembly in which a level vial or other liquid-filled member can be utilized.

Figure 11:
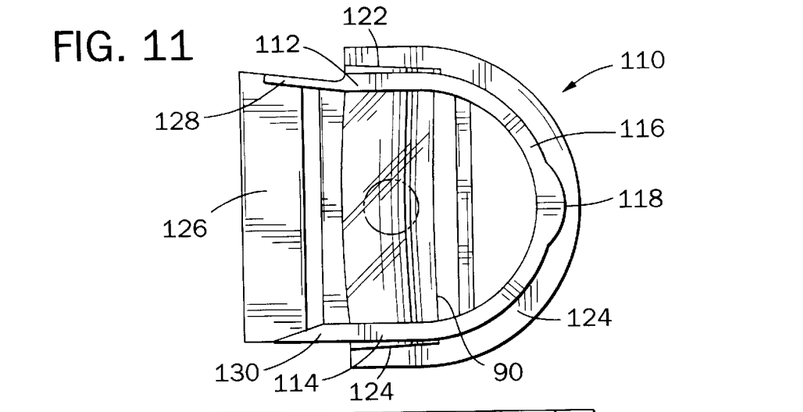
FIG. 11 is an elevation view illustrating a molded vial mounting component similar to that of FIGS. 8 and 9.

FIG. 11 illustrates a vial retainer 110 having a construction much like that of vial retainer 92 (FIGS. 8, 9). Vial retainer 110 includes a pair of spaced walls 112, 114, with a curved wall 116 extending between and interconnecting walls 112, 114. Curved wall 116 includes a locating tab 118. A curved vial 120 is insert molded along with vial retainer 110. Curved vial 90 includes end portions which are encapsulated and surrounded by protrusions 122, 124 which are formed on and extend outwardly from spaced walls 112, 114, respectively. A flange 124 extends outwardly from walls 112, 114 and 116, and is adapted to engage the surface of the frame of a wood level, such as shown at 104 in FIG. 10, for mounting thereto in a manner as is known. A tang 126 extends between mounting fingers 128, 130 which extend outwardly from walls 112, 114, respectively. When a pair of vial retainers 110 are placed in a mirror image relationship such as is illustrated in FIG. 9, fingers 128, 130 engage each other and tangs 126 are in alignment, such that tangs 126 provide a visual separation between vials 90.

Figure 12:
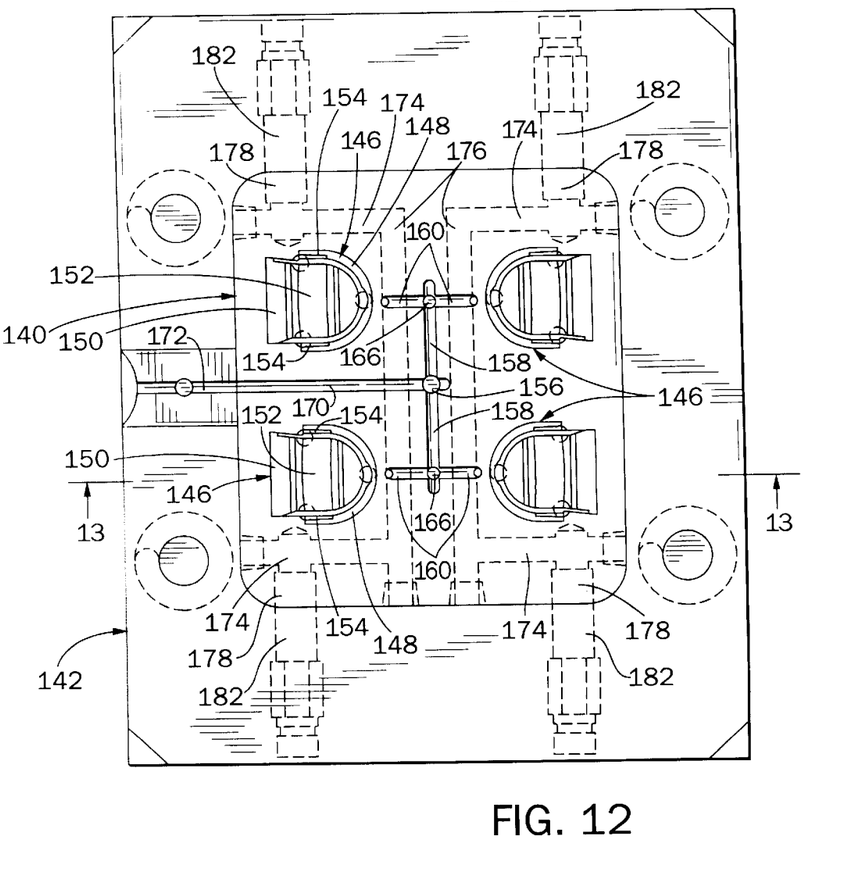
FIG. 12 is a top plan view of a mold section for use in producing the vial mounting component of FIG. 11.
Figure 13:
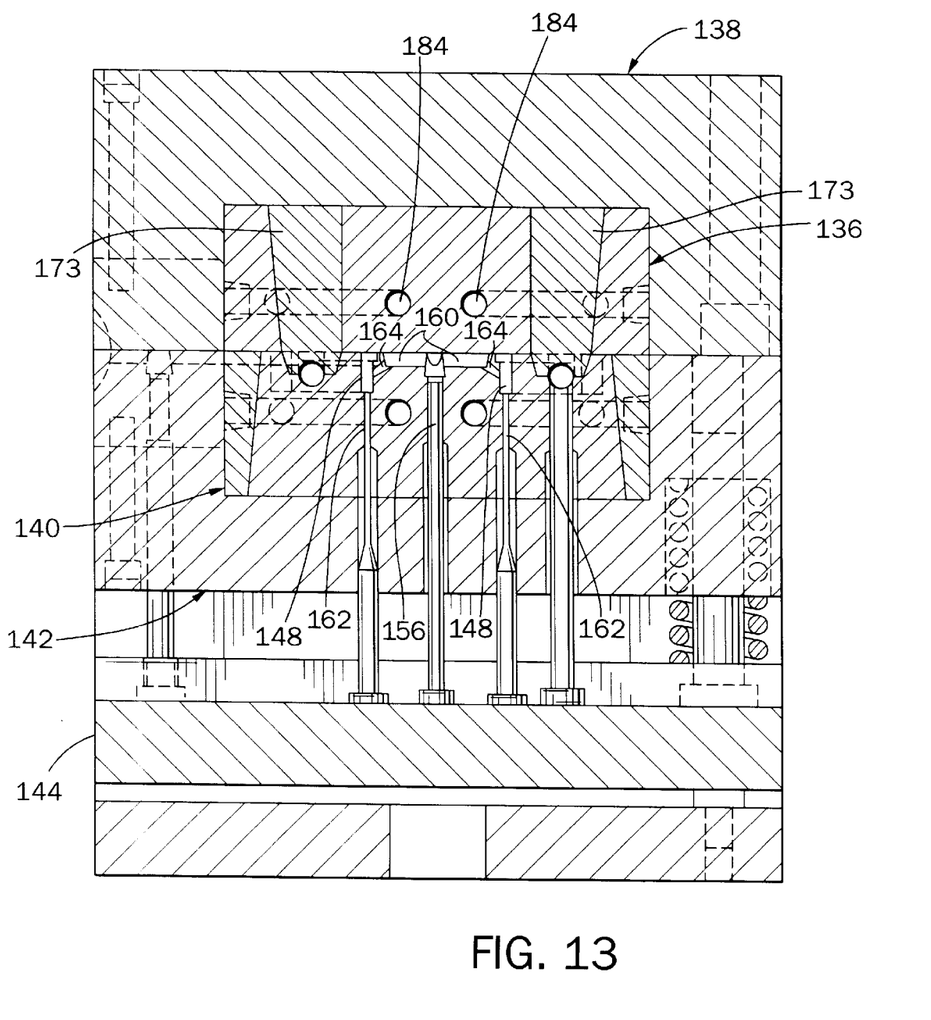
FIG. 13 is a section view taken along line 13—13 of FIG. 12.
Figure 14:
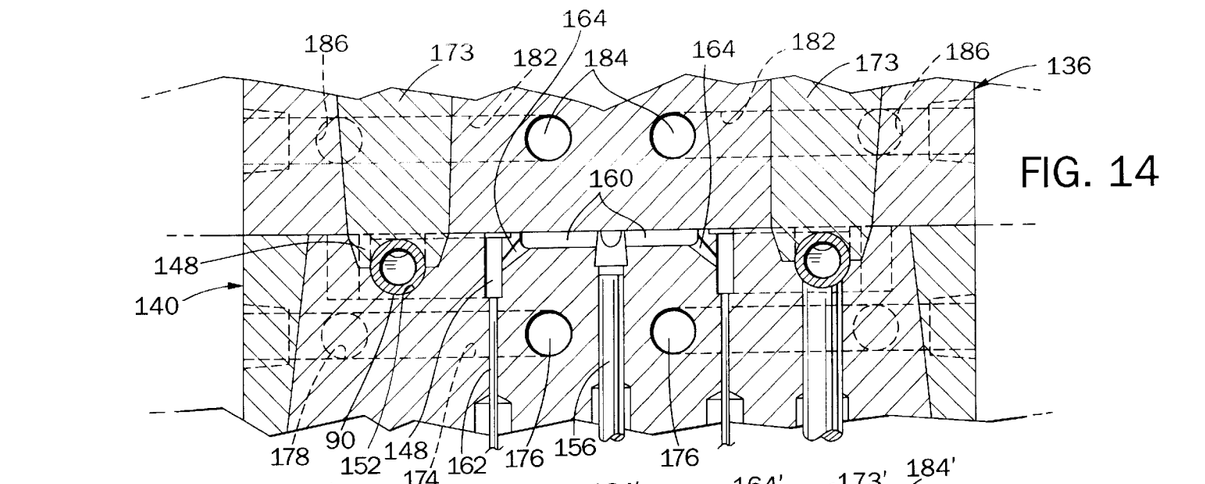
FIG. 14 is an enlarged partial section view showing portions of the mold sections of FIG. 13.

FIGS. 12–14 illustrate a mold assembly 134 for use in constructing vial retainer 110. Generally, mold assembly 134 includes an upper mold section 136 mounted to an upper block 138, and a lower mold section 140 mounted to a lower block 142. In a manner as is known, upper block 138 is mounted to a reciprocating device such as a press, for selectively moving upper block 138 toward and away from lower block 142. Similarly, lower block 142 is supported on a mold base 144, again in a manner as is known. Lower mold section 140 includes four identical cavities, shown generally at 146, each of which has a configuration which matches that of vial retainer 110. Each cavity 146 includes an arcuate recessed area 148 which has a shape corresponding to that of walls 112, 114, 116, as well as flange 124. A tang and finger recess 150 extends from recess 148, and has a shape corresponding to that of tang 126 and fingers 128, 130. Lower mold section 140 and upper mold section 136 include mating structure which defines the space between walls 112, 114, and a vial seating recess 152 is formed in lower mold section 140. Vial seating recess 152 has a shape corresponding to that of vial 90, and extends between the portions of recessed area 148 which form walls 112, 114. A pair of protrusion recesses 154 are located outwardly of the portions of recessed area 148 which form walls 112, 114. Vial 90 is received in vial seating recess 152 and is oriented such that its ends are disposed in protrusion recesses 154. In this manner, vial 90 extends across the portions of recessed area 148 which form walls 112, 114.

A central injection passage 156 is formed in lower mold section 140. A pair of laterally extending trunk passages 158 are formed in the face of lower mold section 140, extending in opposite directions from central injection passage 156. A pair of branch passages 160 extend in opposite directions adjacent the end of each trunk passage 158 opposite central injection passage 156. An auxiliary injection passage 162 is formed in lower mold section 140 at the central location of each recessed area 148. A flow passage 164 extends from the end of each branch passage 160 into recessed area 148. Additional auxiliary injection passages 166 are formed in lower mold section 140, and have an outlet located at the intersection of each trunk passage 158 with its respective branch passages 160. A stem passage 170 is formed in lower mold section 140, and communicates with a stem passage 172 in lower block 142.

In a manner as is known, flowable injection moldable material, such as liquefied plastic, is injected through injection passages 156, 162 and 166 for supply to cavities 146, to form the plastic material into the configuration of vial retainer 110. When injected into each cavity 146, the liquefied plastic material flows around and surrounds the ends of vial 90 at protrusion recesses 154, such that protrusions 122, 124 are formed integrally with walls 112, 114, respectively, to encapsulate and surround the ends of vial 90 with material and to thereby secure vial 90 in a predetermined orientation relative to vial retainer 110 as determined by the orientation of vial seating recess 152 relative to cavity 146.

Upper mold section 136 includes inserts 173, which engage vial 90 when received within vial seating recess 152. Each insert 173 has a configuration which mates with the areas of lower mold section 140 adjacent vial seating recess 152, such that vial 90 is completely surrounded by the material of lower mold section 140 and insert 173 between the portions of recessed area 148 which form walls 112, 114 of vial retainer 110. In this manner, vial 90 is securely maintained in position during injection molding, and insert 173 and lower mold section 140 cooperate to prevent the flow of plastic material inwardly of the portions of recessed area 148 which form walls 112, 114, such that there is no plastic material around vial 90 between walls 112, 114.

Lower mold section 140 includes a pair of mirror image fluid flow passages, including two pairs of transverse end passages 174, with each pair being connected via a longitudinal passage 176. A inlet/outlet port 178 is formed in lower mold section 140 in communication with each transverse passage 174, for receiving cooling fluid supplied through one of a series of inlet/outlet passages 182 formed in lower block 142. Each transverse passage 174 is located outwardly of and adjacent one of mold cavities 146, and each longitudinal passage 176 is located adjacent a pair of mold cavities 146. Each set of transverse passages 174 and its associated longitudinal passage 176 surrounds the material of lower mold section 140 in which a pair of mold cavities 146 are formed. In a manner as is known, cooling fluid is supplied through inlet/outlet passages 182 and inlet/outlet ports 178 to passages 174 and 176, for cooling the material of lower mold section 140 at each mold cavity 146 after each cavity 146 is filled with the moldable material, to accelerate cooling and solidification of the material.

Upper mold section 136 also includes transverse passages 182, longitudinal passages 184 and inlet/outlet ports 186, which have the same configuration as that of transverse passages 174, longitudinal passages 176 and inlet/outlet ports 178 in lower mold section 140, for supplying cooling fluid to the material of upper mold section 136 adjacent cavities 140.

In a manner as is known, upper and lower mold sections 136, 140, respectively, are moved apart after the plastic material has been injection molded into cavities 146 and formed about the ends of vials 90 and sufficiently cooled, and the stems formed by stem passages 168 and 170 are used to lift the molded vial retainers 110, each of which carries a vial 90, out of mold cavities 146. The sprues formed by trunk passages 158, branch passages 160 and flow passages 164 interconnect the molded vial retainers 110 for lifting out of lower mold section 140 as a unit. Thereafter, the sprues are removed in a conventional manner and vial retainers 110 are mounted to a level frame, again in a conventional manner.

Figure 15:
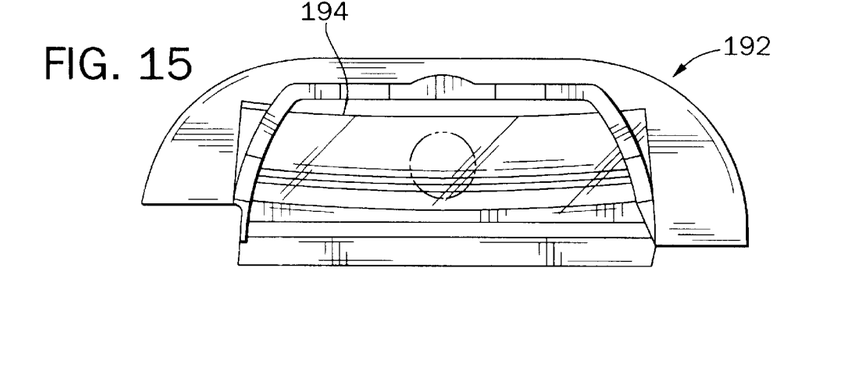
FIG. 15 is a view similar to FIG. 11, showing another embodiment of a vial mounting component.
Figure 16:
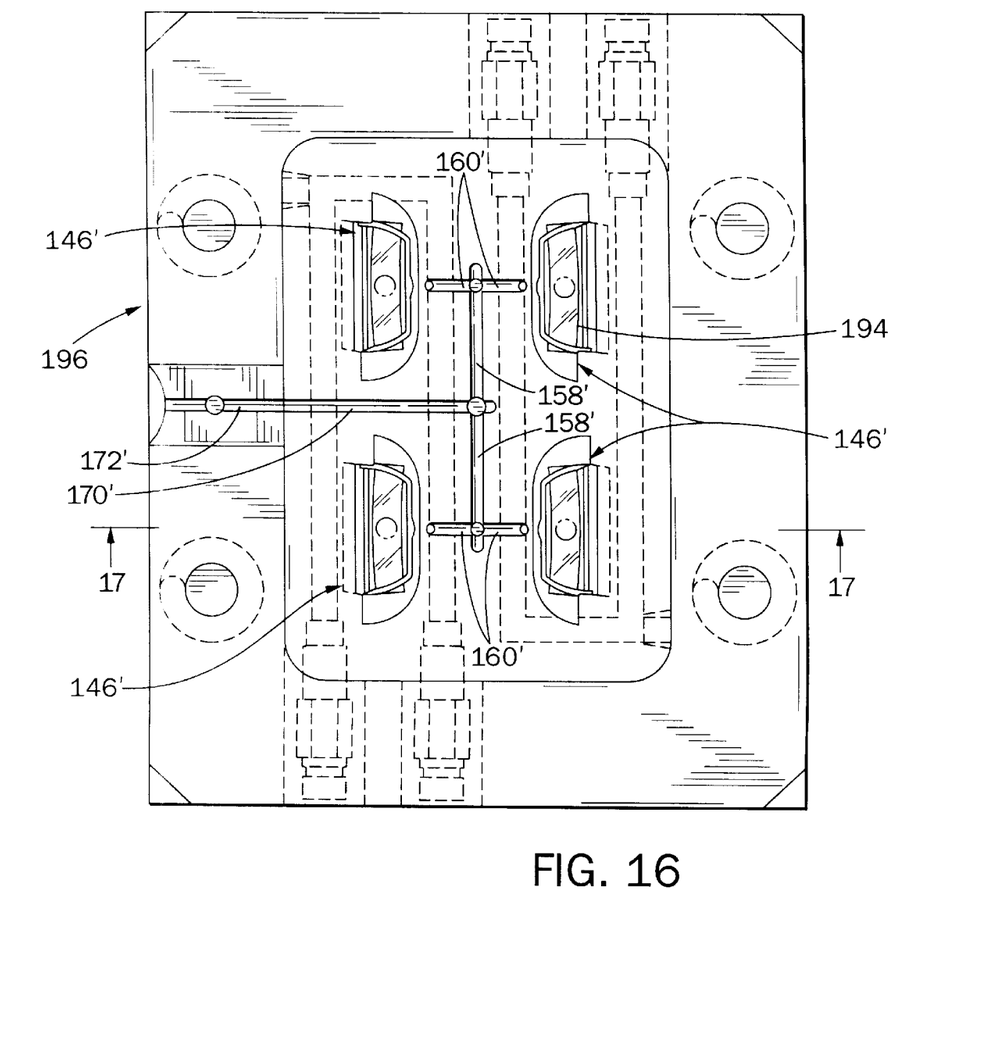
FIG. 16 is a view similar to FIG. 12, showing a mold section for use in constructing the vial mounting component of FIG. 15.
Figure 17:
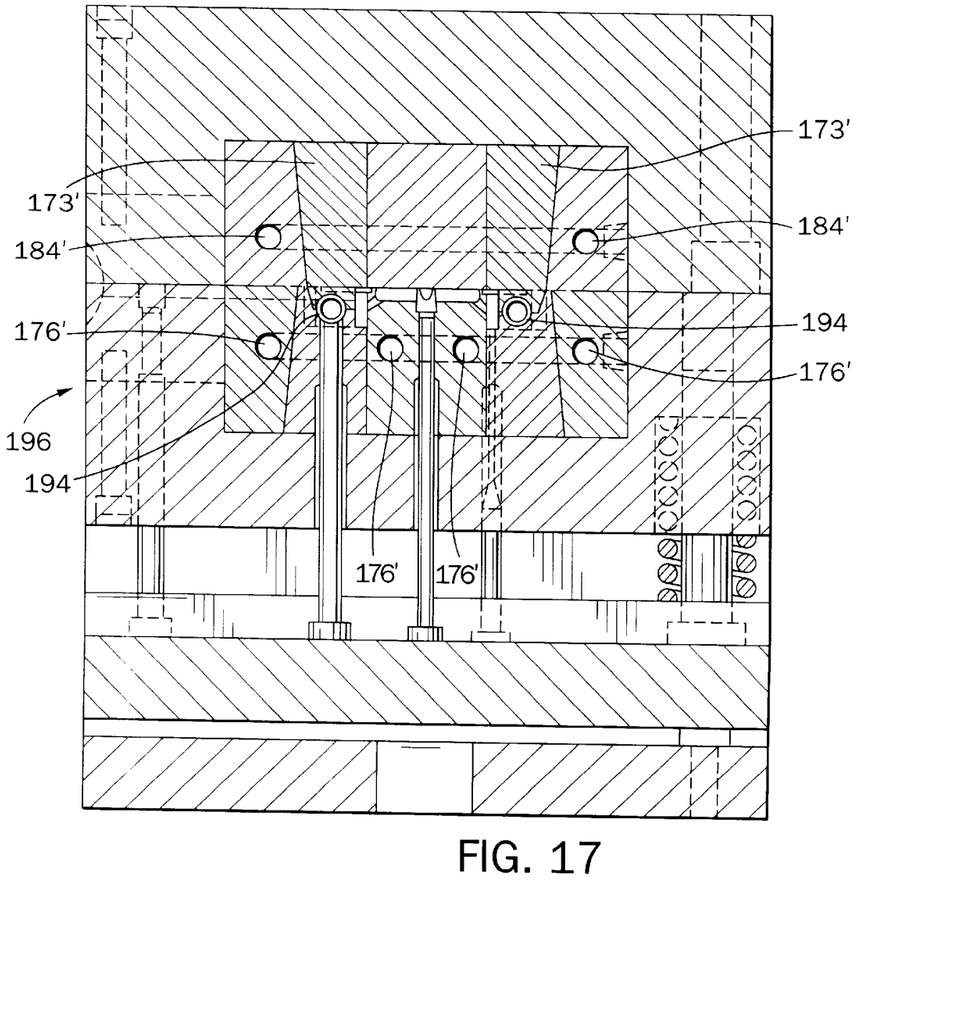
FIG. 17 is a section view taken along line 17—17 of FIG. 15.
Figure 18:
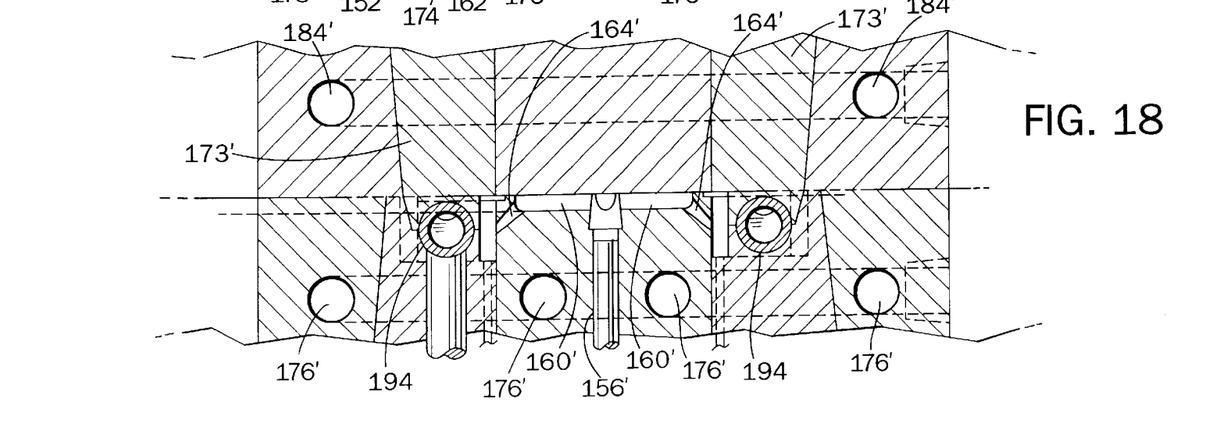
FIG. 18 is an enlarged partial section view of portions of the mold sections of FIG. 17.
Figure 19:
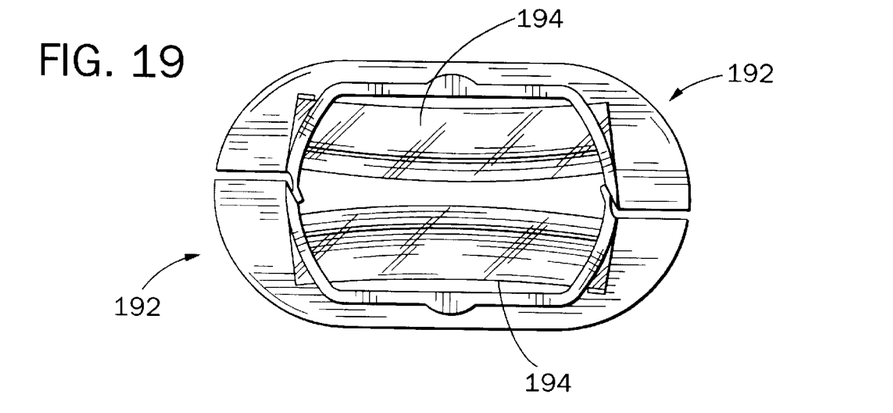
FIG. 19 is a view of a pair of vial mounting members of FIG. 15 assembled together.

FIG. 15 illustrates a vial retainer 192, which is adapted to mount an elongated curved vial 194. The particular configuration of vial retainer 192 differs from that of vial retainer 110, but the general concepts embodied in the construction of vial retainer 192 is identical to that of vial retainer 110. Vial retainer 192 is constructed using a mold assembly 194 (FIGS. 16–18), which operates similarly to mold assembly 138. Accordingly, FIGS. 15–18 are provided with primed reference characters corresponding to those utilized in FIGS. 11–14. FIG. 19 illustrates a pair of vial retainers 192 which are arranged in a mirror image relationship to mount a pair of elongated curved vials 194 within an opening formed in a wood level frame.

FIGS. 12–14 and FIGS. 16–18 illustrate mold assemblies for forming a vial retainer. It can be readily appreciated that the same concepts as are illustrated and described with respect to FIGS. 12–14 and 16–18 are employed to form a member other than a vial retainer, such as composite level 42 (FIGS. 2–4) and a one-piece injection molded level as in FIGS. 6 and 7. It is emphasized, however, that the invention can be used to insert mold a liquid-containing member, such as a level vial, with any body formed of a moldable material. Examples include, but are not limited to, manufacture of tool handles, tool components, tool housings, automotive lamp or light housings or enclosures, or any other application utilizing a level vial or any other liquid-containing member.

Various alternatives and embodiments are contemplated as being within the scope of the following claims particularly pointing out and distinctly claiming the subject matter regarded as the invention.

We claim:

1. A tool, comprising:
   a body formed of a molded material, wherein the molded material is formed so as to define at least one opening; and
   a level vial defining a pair of spaced ends, wherein the level vial extends across the opening and wherein each end of the level vial is surrounded and encapsulated by the molded material of the body to maintain the level vial in a predetermined position relative to the body;
   wherein the ends of the level vial are surrounded and encapsulated by the material of the body simultaneously with molding of the material to form the body.

2. The tool of claim 1, wherein the body is formed to define a level having at least one gauging surface arrangement in a predetermined orientation relative to the level vial.

3. The tool of claim 2, wherein the level defines a series of openings, and wherein a level vial extends across each of the openings and is maintained in position by the molded material of the body surrounding and encapsulating the ends of each level vial.

4. The tool of claim 1, wherein the body is formed by a molding process by which the material of the body is supplied in a flowable state to a cavity having a shape corresponding to the desired shape of the body, and wherein the level vial is placed into the cavity prior to the supply of the flowable material of the body to the cavity, whereby the flowable material when supplied to the cavity flows about end portions of the level vial.

5. The tool of claim 1, wherein the molded material at the opening is formed so as to define a first pair of spaced-apart wall areas and a second pair of spaced-apart wall areas, wherein the level vial extends between and is interconnected with the first pair of wall areas and is spaced inwardly from each wall area of the second pair of wall areas, wherein a gap is located between the level vial and each wall area of the second pair of wall areas.

6. A composite level, comprising:
   a frame having at least one opening;
   a vial having a pair of spaced ends, wherein each end of the vial is engaged with the frame and wherein the vial extends across the opening; and
   vial retaining structure interconnected with the frame and with the ends of the vial, wherein the vial retaining structure is formed of molded material and defines an opening which corresponds in location to the frame opening;
   wherein the vial extends across the vial retaining structure opening and wherein each end of the vial is surrounded and encapsulated by the molded material of the vial retaining structure to maintain the vial within the frame opening;
   wherein the ends of the vial are surrounded and encapsulated by the material of the vial retaining structure simultaneously with molding of the material to form the vial retaining structure.

7. The composite level of claim 6, wherein the frame opening includes a pair of opposed notches, and wherein each vial end is engaged within one of the notches, wherein the notches are configured to position the vial in a predetermined orientation relative to the frame.

8. The composite level of claim 7, wherein the flame includes at least one flange and a web within which the at least one frame opening is formed, wherein the web defines first and second side surfaces, and wherein the vial retaining structure overlies each of the first and second side surfaces defined by the web.

9. The composite level of claim 8, wherein the opening in the vial retaining structure is bounded by one or more edges located inwardly of one or more edges defined by the frame which define the frame opening.

10. The composite level of claim 9, wherein the molded material forming the vial retaining structure defines an expanded area on each side of the frame, wherein each expanded area overlies and encapsulates one of the vial ends and has a transverse dimension greater than that of the flame web and molded material located between adjacent vial retaining structures which overlies each of the first and second side surfaces defined by the web.

11. The composite level of claim 8, wherein the frame defines at least one end, and wherein the molded material extends past the frame end to define an integrally molded end portion for the composite level.

12. The composite level of claim 6, wherein the vial retaining structure is formed so as to define a first pair of spaced-apart wall areas and a second pair of spaced-apart wall areas, wherein the level vial extends between and is interconnected with the first pair of wall areas and is spaced inwardly from each wall area of the second pair of wall areas, wherein a gap is located between the level vial and each wall area of the second pair of wall areas.

13. A vial mounting subassembly for use in mounting a level vial to a level frame having an opening, comprising:
   a vial retainer formed of a molded material, wherein the vial retainer defines a pair of spaced apart wall areas and is adapted for placement within the frame opening; and
   a level vial defining a pair of spaced ends, wherein the level vial extends across the space between the wall areas and wherein each end of the level vial is surrounded and encapsulated by the molded material of the vial retainer forming the wall areas, to maintain the level vial in a predetermined position relative to the vial retainer;
   wherein the ends of the level vial are surrounded and encapsulated by the material of the vial retainer simultaneously with molding of the material to form the vial retainer.

14. The vial mounting subassembly of claim 13, wherein the vial retainer comprises an integrally molded member including a protrusion associated with each of the spaced apart wall areas, wherein each protrusion surrounds and encapsulates an end of the level vial.

15. The vial mounting subassembly of claim 14, wherein each protrusion extends outwardly from an outer surface defined by one of the spaced apart wall areas.

16. The vial mounting subassembly of claim 14, wherein the vial retainer is formed by injection molding a flowable material into a cavity defined by a pair of mold sections, and wherein the vial is inserted into the mold cavity prior to injection of the flowable material into the mold cavity such that the vial is insert molded with the flowable material to form the vial mounting subassembly.

17. The vial mounting subassembly of claim 13, wherein the vial retainer is configured such that a pair of vial retainers are matingly engageable with each other to form a closed vial retaining structure adapted for engagement within an opening defined in the level frame to mount a pair of vials to the level frame.

18. The vial mounting subassembly of claim 13, wherein the vial retainer defines at least a third wall area extending between the first-mentioned pair of wall areas, and wherein the level vial extends between and is interconnected with the first-mentioned pair of wall areas and is spaced from the third wall area, wherein a gap is located between the level vial and the third wall area.

19. An article of manufacture, comprising:
a molded body formed of a molded material, wherein the molded material is formed so as to define an opening; and
a liquid-containing member defining a pair of spaced ends, wherein the liquid-containing member extends across the opening and wherein each end of the liquid-containing member is surrounded and encapsulated by the molded material of the body to maintain the liquid-containing member in a predetermined position relative to the body;
wherein the ends of the liquid-containing member are surrounded and encapsulated by the material of the body simultaneously with molding of the material to form the body.

20. The article of claim 19, wherein the liquid-containing member comprises a level vial in the form of a closed cylindrical member defining an internal cavity partially filled with liquid.

21. The article of claim 20, wherein the molded body molded comprises a level defining at least one gauging surface and a web within which the opening is formed and across which the level vial extends in a predetermined orientation relative to the gauging surface.

22. The article of claim 20, wherein the body comprises a vial mounting member separate from and adapted for engagement with a level frame.

23. The article of manufacture of claim 19, wherein the molded material at the opening is formed so as to define a first pair of spaced-apart wall areas and a second pair of spaced-apart wall areas, wherein the liquid-containing member extends between and is interconnected with the first pair of wall areas and is spaced inwardly from each wall area of the second pair of wall areas, wherein a gap is located between the liquid-containing member and each wall area of the second pair of wall areas.

24. A method of forming a molded member having an opening, comprising the steps of:
providing a mold having a cavity defining a shape corresponding to that of the molded member;
positioning a liquid-containing member within the mold cavity wherein the liquid-containing member defines a pair of spaced ends and wherein the liquid-containing member is positioned such that the ends of the liquid-containing member extend into spaced portions of the mold cavity corresponding to spaced apart areas of the molded member bounding the opening and such that the liquid-containing member extends across the opening; and
injecting moldable material in a flowable state into the mold cavity, wherein the moldable material assumes the shape of the molded member and simultaneously surrounds and encapsulates the ends of the liquid-containing member.

25. The method of claim 24, wherein the mold cavity is formed by a pair of mold sections, wherein the mold sections include structure for receiving the liquid-containing member when the mold sections are brought together to form the mold cavity.

26. The method of claim 25, wherein the liquid-containing member defines a first end portion which extends into a first one of the pair of mold cavity areas, and a second end portion extending into a second one of the pair of mold cavity areas, wherein injection of the moldable material into the first and second mold cavity areas functions to surround and encapsulate the first and second end portions of the liquid-containing member with moldable material.

27. The method of claim 25, wherein the liquid-containing member comprises a level vial in the form of a closed cylindrical member defining an internal cavity partially filled with liquid.

28. The method of claim 27, further comprising the step of engaging a level frame with the mold sections prior to injecting the moldable material into the mold cavity, wherein the level frame includes notches and wherein the level vial is engaged with the mold sections such that the end portions of the level vial are received within the notches, and wherein the mold cavity is configured so as to locate moldable material about the level frame at the notches and about the ends of the level vial.

29. The method of claim 27, wherein the mold cavity is configured to form a level having one or more openings and at least one gauging surface, wherein a level vial extends across each opening.

30. The method of claim 29, wherein the mold cavity is configured to form a vial mounting component adapted for engagement with a level frame.

31. The method of claim 24, wherein the mold cavity is shaped so as to form the molded member with a first pair of spaced-apart wall areas and a second pair of spaced-apart wall areas, and wherein the liquid-containing member is positioned within the mold cavity such that the liquid-containing member extends between the portions of the mold cavity corresponding to the first pair of wall areas and is spaced inwardly from the portions of the mold cavity corresponding to the second pair of wall areas, wherein the mold includes portions which form a gap in the molded member between the liquid-containing member and each wall area of the second pair of wall areas.

* * * * *

UNITED STATES PATENT AND TRADEMARK OFFICE
CERTIFICATE OF CORRECTION

PATENT NO. : 6,243,957 B1
DATED : June 12, 2001
INVENTOR(S) : Richard J. Gruetzmacher et al.

It is certified that error appears in the above-identified patent and that said Letters Patent is hereby corrected as shown below:

Title page,
Item [75], Inventors, delete "Jr." after "Richard J. Gruetzmacher".

Column 9,
Line 62, delete "flame" and substitute therefore -- frame --;

Column 10,
Line 9, delete "flame" and substitute therefore -- frame --;

Column 12,
Line 36, delete "29" and substitute therefore -- 27 --.

Signed and Sealed this

Twelfth Day of November, 2002

Attest:

Attesting Officer

JAMES E. ROGAN
Director of the United States Patent and Trademark Office